(12) United States Patent
Salas et al.

(10) Patent No.: US 7,089,297 B1
(45) Date of Patent: Aug. 8, 2006

(54) MECHANISM FOR AUTOMATICALLY CONFIGURING A NETWORK RESOURCE

(75) Inventors: Jose M. Salas, Fremont, CA (US); Patrick Lupo, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 965 days.

(21) Appl. No.: 09/866,111

(22) Filed: May 25, 2001

(51) Int. Cl.
*G06F 15/177* (2006.01)

(52) U.S. Cl. .................. 709/220; 709/221; 709/222; 713/1; 713/100

(58) Field of Classification Search ........ 709/220–222; 713/1, 100
See application file for complete search history.

(56) References Cited

U.S. PATENT DOCUMENTS

| | | | | |
|---|---|---|---|---|
| 6,012,088 A | * | 1/2000 | Li et al. ..................... | 709/219 |
| 6,026,438 A | * | 2/2000 | Piazza et al. ............... | 709/221 |
| 6,161,125 A | * | 12/2000 | Traversat et al. ........... | 709/203 |
| 6,345,294 B1 | * | 2/2002 | O'Toole et al. ............. | 709/222 |
| 6,782,474 B1 | * | 8/2004 | Ylonen ....................... | 713/162 |
| 2002/0103878 A1 | * | 8/2002 | Moncibais .................. | 709/217 |
| 2002/0198900 A1 | * | 12/2002 | Kruglikov et al. .......... | 707/200 |

* cited by examiner

*Primary Examiner*—Kim Huynh
*Assistant Examiner*—Eron Sorrell
(74) *Attorney, Agent, or Firm*—Hickman Palermo Truong & Becker, LLP; Bobby K. Truong

(57) ABSTRACT

A mechanism is disclosed for automatically configuring a resource to interact with a network. In one embodiment, the mechanism takes the form of a configuration program executed by the resource being configured. The program obtains a set of configuration information, configures the resource using the configuration information, registers the resource with a domain, and creates a user account on the domain. In addition, the program copies a profile from one account to another to migrate an operating environment from an existing account into a new account. By automating the resource configuration process, the program transforms what currently is a time consuming task requiring potentially thousands of manhours into a simple task that takes just minutes.

31 Claims, 5 Drawing Sheets

CONFIGURATION PROGRAM

402 — IF NAME OF PROGRAM IS PROFILE COPIER.EXE. SKIP TO PROFILE COPIER CODE SECTION

404 — IF PROGRAM IS RUN WITH A "/C" SUFFIX IMBED CONFIGURATION INFORMATION

406 — BEGIN CONFIGURATION CODE
- 
- 
-

CONFIGURATION INFORMATION — 410

END CONFIGURATION CODE

408 — BEGIN PROFILE COPIER CODE
- 
- 
-

END PROFILE COPIER CODE

*Fig. 4*

MECHANISM FOR AUTOMATICALLY CONFIGURING A NETWORK RESOURCE

BACKGROUND

This invention relates generally to networks, and more particularly to a mechanism for automatically configuring a resource to interact with a network.

To configure a resource (e.g. a desktop computer, a laptop computer, a server, etc.) to interact with a network, a number of tasks need to be performed. These tasks include, for example: (1) configuring the resource with all of the appropriate network settings to enable it to communicate with the other components on the network (e.g. domain controller, DNS server, WINS server, etc.); (2) registering the resource with the network to enable the network to recognize the resource; and (3) creating a user account on the network to enable a user to log on to the network using the resource.

Typically, these tasks are performed manually by a network administrator. That is, while sitting at the resource, the network administrator manually enters all of the network settings using various screens and utilities of the resource, registers the resource with the network, and creates all of the necessary user accounts. Because of the large amount of work involved, this process usually takes a considerable amount of time to complete. It is not uncommon, for example, for a network administrator to spend up to an hour configuring a resource. This is assuming that the administrator does everything properly the first time. If the administrator overlooks or incorrectly performs certain aspects of the process, thereby requiring all or parts of the process to be repeated, then the configuration of the resource can take even longer. Overall, configuring a resource is a labor-intensive and time-consuming process. Multiply the effort required on each resource by the number of resources and it becomes clear that in a large network, the task of configuring the individual resources can be a monumental one requiring hundreds or even thousands of manhours.

This problem is exacerbated by the fact that the configuration process may need to be performed more than once. Specifically, each time a significant change is made to a network, one or more resources may need to be reconfigured. For example, if a company decides to alter its network such that it becomes necessary to move some resources from one domain to another, then each of the resources being moved will need to be reconfigured. This means that the configuration process discussed above will have to be repeated for each of these resources, which in turn means that the cost of configuring the resources will have to be borne again. If yet another network change is implemented, the reconfiguration cost will have to be borne yet again. Over time, the cost of reconfiguring resources can become extremely high. Because of the high cost associated with reconfigurations, many companies choose to stay with their current network arrangements rather than move to newer arrangements, even if the newer arrangements would be more efficient. This is not a desirable result.

From the above discussion, it is clear that the cost associated with configuring network resources is inordinately high. Accordingly, an improved configuration methodology, which enables resources to be configured more cost-effectively and more efficiently, is needed.

SUMMARY

To overcome the shortcomings of the prior art, the present invention provides a mechanism for automating the process of configuring a resource to interact with a network. In one embodiment, the mechanism takes the form of a configuration program executed by a resource to carry out the configuration process. The mechanism may be used to configure a new resource, or to reconfigure an existing resource. By automating the configuration process, the present invention removes the need for a network administrator to manually configure each resource. Instead, the administrator may distribute the configuration program to the users of all of the resources that need to be configured, and have those users run the program on those resources. The program will automatically perform all of the necessary configuration tasks. By eliminating the need to manually configure each resource, the present invention turns what used to be a time-consuming task requiring potentially thousands of manhours into a simple task requiring only minutes. Hence, enormous cost savings may be derived from the present invention.

The configuration program, in accordance with one embodiment of the present invention, operates as follows. Initially, the program obtains the configuration information that it uses to properly configure the resource on which it is executed. This configuration information may include, for example, the proper network settings (e.g. the IP addresses for a WINS server and a DNS server, the name of a particular domain, etc.), certain information specific to the resource and the user (e.g. the IP address and the hostname of the resource, the username for the user, etc.), and other pertinent information (e.g. an administrator username and password for the domain specified in the network settings). After the configuration information is obtained, the configuration program automatically performs the following operations. In one embodiment, the following operations are performed without further user intervention.

Using the configuration information, the configuration program configures the resource accordingly. This may involve, for example, storing the network settings into the resource, updating the hostname or IP address of the resource (if needed), etc. In addition, as an option, the configuration program creates a local account on the resource for the username specified in the configuration information (assuming a local account does not already exist). This local account allows a user to log in to and use the resource when the user is not logged on to a network. In addition, the configuration program registers the resource with a domain controller. Through this registration process, the configuration program causes the resource to be recognized by the domain controller as being part of a particular domain. Furthermore, the configuration program creates an account on the particular domain for the username specified in the configuration information. This account will allow the user to log on to the particular domain in the future to access other resources in that domain. After these operations are performed, the resource is properly configured for that domain. It may thereafter be used by a user to log on to and access resources within that domain.

As noted above, the configuration program may be used to reconfigure an existing resource as well as to configure a new resource. One possible use of the program's reconfiguration capability is to move a resource and a user account from one domain to another. In making such a move, the configuration program reconfigures the resource for the new domain, in the manner discussed previously. In addition, in one embodiment, it also gives the user the option of copying the profile associated with the user's old domain account into the new domain account. The profile comprises information pertaining to all of the user's environmental preferences (e.g. the user's desired arrangement of icons, the applications that can be run from the account, the look and feel of the user interface, etc.). By copying the profile into the new domain account, the configuration program makes the transition from domain to domain appear seamless to the user. It should be noted that very few if any network administrators currently copy existing profiles into new accounts. As a result, when a user account is moved from one domain to another, the user is typically required to re-specify all of his preferences in the new account. This can take a significant amount of time and effort. The configuration program removes this burden from the user.

Overall, the configuration program greatly reduces the amount of human effort required to configure a resource. By doing so, it streamlines and optimizes the efficiency of the configuration process. Accordingly, the present invention represents a significant improvement over the prior art.

BRIEF DESCRIPTION OF THE DRAWINGS

FIG. 4 is a functional diagram of the code and information contained in one embodiment of the configuration program.

DETAILED DESCRIPTION OF EMBODIMENT(S)

Functional Overview

Figure 1:
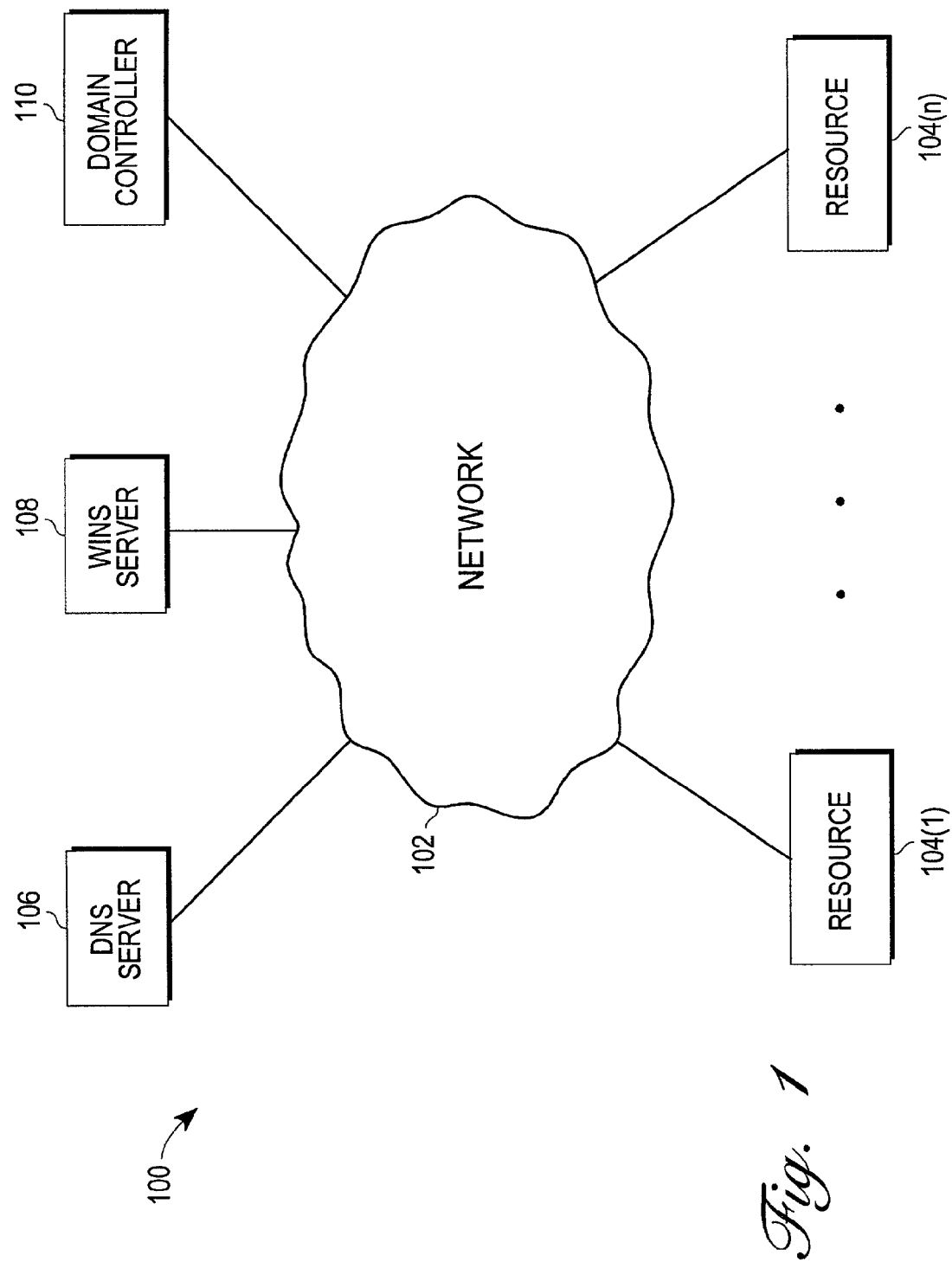
FIG. 1 is a functional block diagram of a system in which one embodiment of the present invention may be implemented.

With reference to FIG. 1, there is shown a functional block diagram of a system 100 in which one embodiment of the present invention may be implemented. In the following discussion, it will be assumed for the sake of illustration that the network environment is one based upon the Windows operating system. It should be noted, though, that the present invention is not so limited, but rather may be applied generally to any environment in which it is desirable to configure a resource to interact with a network.

As shown in FIG. 1, the overall system 100 comprises a network 102, a plurality of resources 104 coupled to the network 102, and a plurality of control servers 106, 108, 110. For purposes of the present invention, network 102 may take on any desired form. For example, it may be a local area network (LAN) or a wide area network (WAN), such as the Internet. It may even be as simple as direct connections between various components. Any mechanism capable of facilitating communication between the various components may serve as the network 102.

Communication on the network 102 is controlled and coordinated by the control servers 106, 108, 110. More specifically, the WINS server 108 coordinates communication among the components on a Windows level. Given the name of a particular domain, resource, or server on the network, the WINS server 108 returns an associated IP address. For example, if a resource 104 provides a domain name to the WINS server 108, the WINS server 108, in response, resolves the domain name to a particular domain controller 110 that controls that domain. Further, the WINS server 108 determines the IP address associated with the domain controller 110, and returns it to the resource 104 that provided the domain name. Thereafter, the resource 104 may use the returned IP address to access the appropriate domain controller 110. As this example illustrates, the WINS server 108 acts as a central repository of information for the components in the network. It may be invoked by any component in the network to obtain information (e.g. the IP address) pertaining to another component in the network.

The DNS server 106 serves a function similar to that of the WINS server 108, but at a lower network level. The DNS server 106 is usually invoked when it is desirable to access a network component using a lower level protocol, such as FTP and TellNet. Like the WINS server 108, the DNS server 106 receives an identifier for a network component and returns an IP address for that component. That IP address may thereafter be used to access the component.

Resources 104 in a network are often grouped into one or more domains. Access to each of these domains is controlled by a corresponding domain controller 110. In system 100, there may be one or more domain controllers 110, and each domain controller 110 may control access to one or more domains. Basically, a domain represents a particular grouping of resources 104. Resources 104 may be grouped for various reasons, including but not limited to business and security reasons. For each domain, there is maintained by the domain controller 110 that controls that domain a list of all of the resources 104 registered in that domain. This list represents all of the resources 104 that are recognized by the domain controller 110 as being within that domain, and it is access to this list of resources that is controlled by the domain controller 110. If a resource 104 is not on this list, it is not a part of the domain and hence cannot be accessed while in that domain.

In addition to a list of resources 104, the domain controller 110 also maintains a set of user accounts for a domain. Using a valid user account, a user may log in to and access resources 104 within a domain. A point to note is that even with a valid user account, a user may not be able to access all of the resources 104 within a domain. This is because certain resources 104 may be restricted to being accessed by certain user accounts. To specify which resources 104 may be accessed by which user accounts, a set of privileges is assigned to each user account. These privileges dictate which resources 104 may be accessed by each user account. These privileges are set by the domain controller 110 at the time of account creation (and may be modified thereafter), and are enforced by the domain controller 110 at access time.

To facilitate the process of assigning privileges to user accounts, one or more user groups may be created within a domain, with each user group having a set of privileges assigned thereto. Once a user group is created, one or more user accounts may be associated with the user group. Each user account associated with the user group has all of the privileges assigned to that user group. Thus, with a user group, it is not necessary to assign the same set of privileges individually to a plurality of user accounts. Rather, the set of privileges are assigned to the user group, and then the individual user accounts are associated with the user group. The net effect is the same as if the privileges were assigned individually to the user accounts. The advantage of a user group is that it reduces the effort required to assign and to maintain privileges for a large number of user accounts. To assign the same privileges to multiple user accounts, the user accounts are simply associated with the same user group. To update the privileges for a large number of user accounts, the privileges of the user group associated with those user accounts are updated. The update automatically propagates to the individual user accounts. As this discussion shows, the use of user groups significantly simplifies the privilege assignment process. In one embodiment, each user account may be associated with zero, one, or multiple user groups.

In addition to the components already described, the system 100 further comprises one or more resources 104. These resources 104 may comprise any type of resource, including but not limited to desktop computers, laptop computers, servers, as well as other components. Each resource 104 may request services, provide services, or both. Before each resource 104 can properly interact with the rest of the components on the network, it is first configured. This configuration process may involve, for example, configuring the resource 104 with the proper network settings to enable it to communicate with other components on the network, configuring the resource 104 with certain resource-specific settings, registering the resource 104 with one or more proper domains, creating a new user account on the domain, etc. As noted previously, this configuration process is currently being carried out manually by a network administrator. In contrast, in one embodiment of the present invention, the configuration process is performed automatically. More specifically, in one embodiment, a configuration program is executed by a resource 104 to configure that resource 104 to interact with the network. By automating the configuration process, the amount of effort required on the part of an administrator is greatly reduced, which in turn significantly enhances the efficiency of the configuration process.

Operation of Configuration Program

With reference to the flow diagrams of FIGS. 2 and 3, the operation of one embodiment of the configuration program will now be described in detail. According to one embodiment, the configuration program is executed on each resource 104 that is to be configured. Upon execution, the configuration program automatically configures the resource 104 on which it is executed to interact with the network. To enable the configuration program to be executed on a resource 104, the configuration program may be transported to the resource 104 using one of various methods. These methods include, but are not limited to, the use of portable storage (e.g. floppy disk), email (e.g. as an attachment), and network transfer (e.g. by FTP or by remote access of the resource). However the configuration program is transported to the resource 104, execution of the configuration program on the resource 104 causes the following operations to be performed. In the following discussion, it will be assumed for the sake of example that resource 104(1) is a laptop computer, and that the program is executed on resource 104(1) to configure it to interact with the network.

Figure 2:
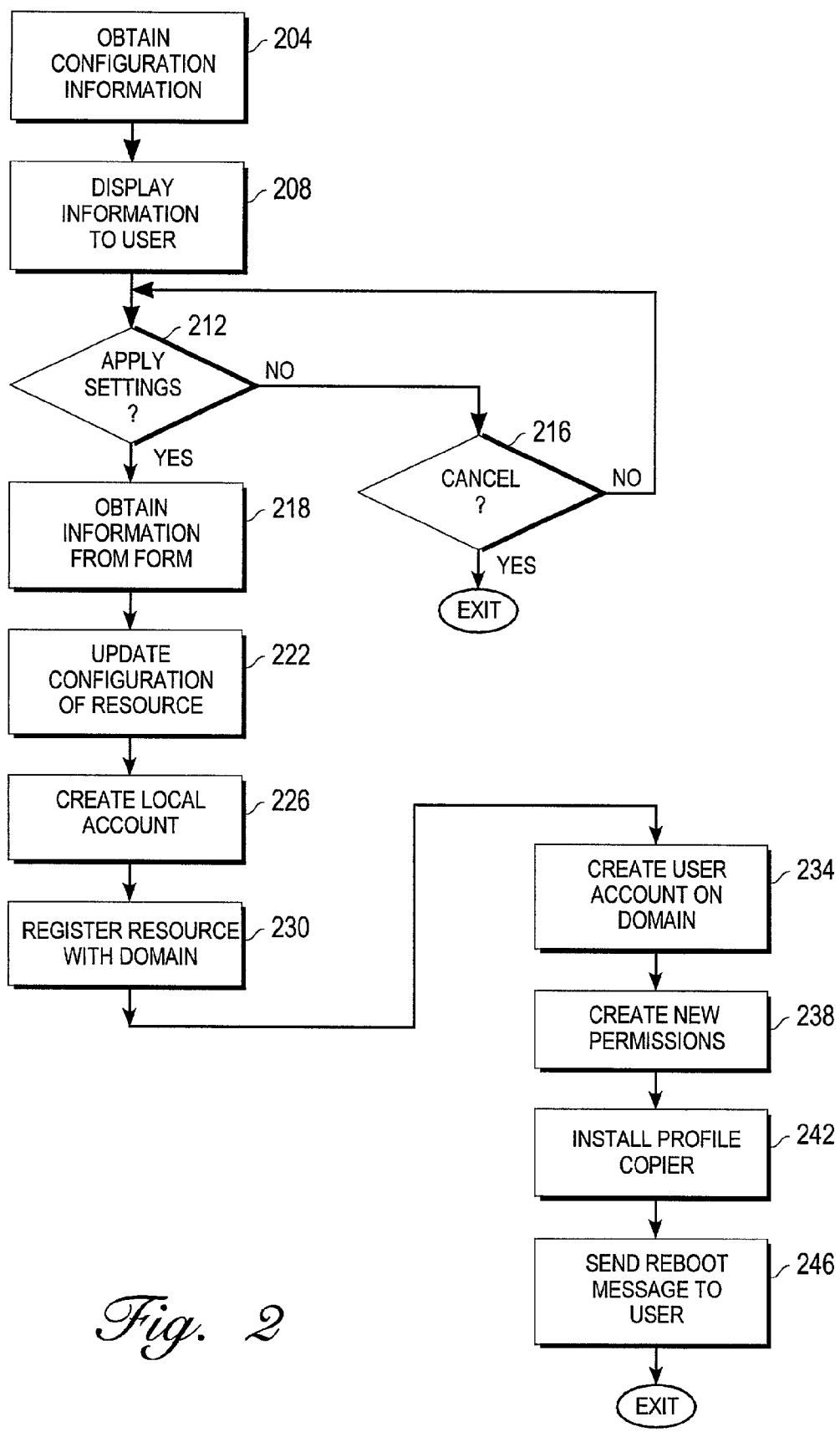
FIG. 2 is a flow diagram illustrating the operation of one embodiment of the configuration program.
Figure 3:
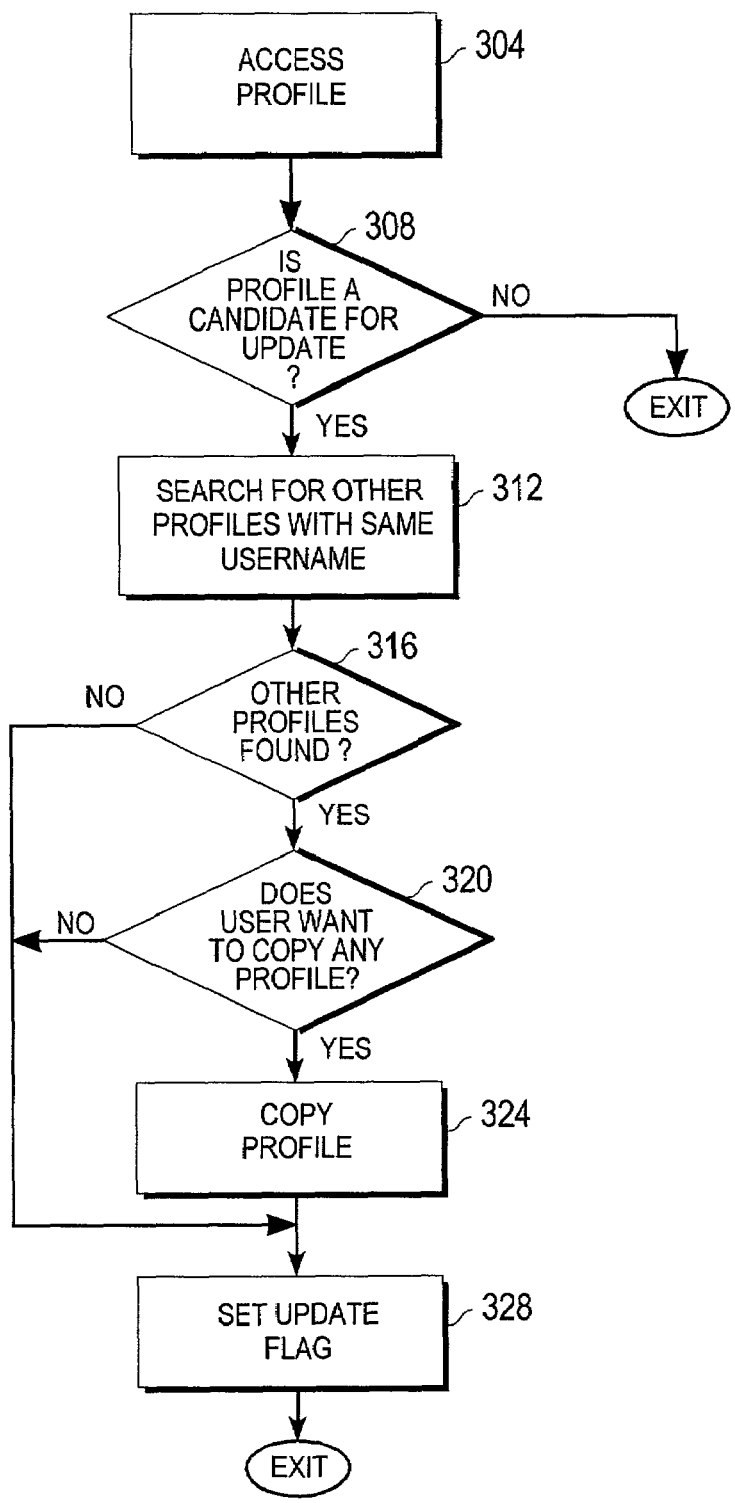
FIG. 3 is a flow diagram illustrating the operation of one embodiment of the profile replication aspect of the configuration program.

As shown in FIG. 2, the configuration program operates by initially obtaining (204) a set of configuration information. This information provides the configuration program with the information that it uses to configure the resource 104(1). In one embodiment, a portion of the configuration information is obtained from the code of the configuration program. That is, a portion of the configuration information is embedded within the configuration program itself. Embedding the information in this manner enables the configuration program to be self-contained. Thus, to execute the program, it is not necessary to load any data files. Instead, the program may be run based upon its own embedded information. As a result, a network administrator may imbed certain configuration information into the program, distribute the program to users, and have the users run the program as is. No loading or other action is needed on the part of the user. Embedding configuration information in this way minimizes the tasks that need to be performed by the end user, thereby, simplifying the configuration process.

FIG. 4 shows one embodiment of the configuration program in which configuration information is embedded within the program. As shown in FIG. 4, the program comprises a plurality of code sections 402–408. Code section 406 is the portion of the program that configures a resource 104(1) to enable the resource 104(1) to interact with a network. Embedded within that code section 406 is a set of configuration information 410. In one embodiment, the configuration information 410 is embedded within the program by operation of the program itself. More specifically, if at the time the configuration program is run, an administrator appends a "/c" to the end of the executable name, code section 404 of the program is invoked. This code section 404 prompts the administrator for configuration information, and upon receiving it, imbeds the configuration information into section 410 of the configuration code 406. The next time the configuration program is executed, it will have the configuration information 410 that it uses to configure a resource 104(1). The configuration information 410 may comprise information that should be kept secret. To protect such secret information, the code section 404 may encrypt the configuration information 410 before imbedding it into the program. If that is done, then the configuration code 406 will decrypt the configuration information 410 before using it to configure a resource 104(1).

The configuration information 410 may comprise various sets of information. In one embodiment, it comprises: (1) IP addresses for a primary and a secondary WINS server; (2) IP addresses for a primary and a second DNS server; (3) a domain name; (4) an administrator username for the domain; and (5) a password associated with the administrator username. Upon execution, the configuration code 406 of the configuration program extracts this information 410 from the program.

As part of block (204), the configuration program also obtains information specific to the resource 104(1) itself. In one embodiment, this information comprises: (1) the IP address of the resource 104(1); (2) the hostname of the resource 104(1); (3) the subnet mask assigned to the resource 104(1); and (4) the username of the user that is currently using the resource 104(1). In one embodiment, the configuration program obtains this information by reading the registry of the resource 104(1) (Windows-based systems maintain such a registry).

After the configuration information is obtained, the configuration program, in one embodiment, calculates a gateway value based upon the IP address of the resource 104(1) and the subnet mask. In some systems (e.g. DHCP systems), IP addresses are assigned dynamically. For such systems, there is no static IP address associated with the resource 104(1); hence, no gateway value is calculated.

After the configuration program obtains the configuration information and calculates the gateway value, it displays (208) the information to a user. Specifically, according to one embodiment, the following information is displayed: the IP addresses of the primary and second WINS servers; the IP addresses of the primary and secondary DNS servers; the name of the domain specified in the configuration information 410; the hostname of the resource 104(1); the IP address and gateway value for the resource 104(1) if static addressing is implemented; a checkbox for implementing dynamic addressing; and the username of the current user of the resource 104(1). In one embodiment, this information is displayed to the user using a form comprising a plurality of fields for holding the various sets of information. The form provides the user with the opportunity to change the values of any or all of the fields. In some implementations, it may desirable to render some of the fields (e.g. the WINS server IP address field) unalterable. In such a case, some of the fields may be grayed out to indicate that they cannot be changed.

After displaying the information and providing the user with the opportunity to update/change the information, the configuration program enters a loop to monitor for either an "apply" command or a "cancel" command from the user. If a "cancel" command is received (216), then the program exits and terminates execution. However, if an "apply" command is received (212), then the program proceeds to (218) to automatically complete the rest of the configuration process. In one embodiment, no further user intervention is needed once the "apply" command is received.

At block (218), the configuration program obtains the configuration values from the form displayed to the user. These values may comprise the default values that the program initially displayed to the user, or new values (e.g. new username, new hostname, etc.) entered by the user, or a combination of both. After obtaining the configuration information from the form, the configuration program proceeds to update (222) the configuration of the resource 104(1). In one embodiment, this involves storing various values into the registry of the resource 104(1). These values may include, for example, network settings such as the IP addresses of the primary and secondary WINS servers, the IP addresses of the primary and secondary DNS servers, and the domain name. In addition, the values may include certain resource and user specific information, such as the hostname, IP address, and gateway associated with the resource 104(1), as well as the username specified in the form.

In addition to updating the configuration of the resource 104(1), the configuration program may optionally create (226) a local account for the specified username, if a local account has not already been created. This local account will enable a user to use the username to log on to and use the resource 104(1) when the resource is in local mode (i.e. is not logged on to a network account). Once that is done, local configuration of the resource 104(1) is complete.

Thereafter, the program proceeds to interact with the network to register (230) the resource 104(1) with the proper domain. To do so, the program logs out of the account that it is currently running under, and logs back in to the resource 104(1) using a network account.

To register the resource 104(1) with the proper domain, the program first consults an appropriate WINS server. To do so, the program retrieves the IP address of one of the WINS servers obtained from the configuration information 410 (FIG. 4). Then, using the retrieved IP address, the program causes the resource 104(1) to send a communication to the WINS server. Included in this communication is the name of the domain specified in the configuration information 410. In response to the communication, the WINS server resolves the domain name to a particular domain controller that controls the specified domain, and returns the IP address of the domain controller to the resource 104(1). Using this IP address, the configuration program communicates with the domain controller to access and to log on to the proper domain.

More specifically, using the administrator username and password obtained from the configuration information 410, the configuration program interacts with the domain controller to log on to the specified domain. In one embodiment, the administrator username used to log on to the domain has high-level privileges so that the configuration program is given the authority that it needs to perform all of its functions. Once logged on to the domain, the configuration program sends a request to the domain controller 110 to register (230) the resource 104(1) with the domain. This request may include information specific to the resource 104(1), such as the resource's hostname, IP address, etc. This registration process may involve some authentication operations carried out between the domain controller and the resource 104(1). Assuming the resource 104(1) is authenticated, the resource 104(1) is added to the domain controller's list of recognized resources for that domain.

Thereafter, the configuration program proceeds to create (234) a user account on the domain for the username specified in the form displayed to the user (note: this username is different from the administrator username used previously to log on to the domain). To create the account, the configuration program sends an account creation request to the domain controller, passing along certain information pertaining to the account, such as the username on the account, and the privileges to be granted to the account. The request may also specify that the account is to be associated with a particular user group. In response to the request, the domain controller creates the user account. Once created, the account may be used by a user to log on to and access resources within the domain. The resource 104(1) and the user are thus set up to interact with other components on the specified domain.

Registration of the resource 104(1) and setting up of the domain account are performed on the network side. On the local resource side, some additional tasks are performed. One of these tasks is the creation of a permission on the resource 104(1) for the network domain account that has just been created. A permission basically indicates that a particular account may be accessed using the resource 104(1). There is a permission for each domain name-username combination. For example, if a username X has both a local account on the resource 104(1) and an account on domain D1, then it would have two permissions on the resource 104(1). One permission would be for the domain name-user combination of Local-X, and another would be for the domain name-username combination of D1-X. These permissions indicate that these accounts may be accessed using the resource 104(1). Unless there is a permission specified in the resource 104(1), an account cannot be accessed using the resource 104(1). Since in block (234) a user account was created on the specified domain, a corresponding permission is created (238) in the resource 104(1) to enable the new domain account to be accessed using the resource 104(1).

In addition to creating a permission for the newly created domain account, the configuration program may further create (238) other new permissions for the specified domain to facilitate migration to the domain. To elaborate, a resource 104(1) may accommodate a number of different users. This means that a number of different users with different usernames may use the resource 104(1) to log in to a number of different local accounts and network accounts. This in turn means that there may be a number of different permissions stored in the resource 104(1), one for each domain name-username combination. Because these permissions are domain name and username specific, if the resource 104(1) is moved from one domain to another, all of the permissions in that resource 104(1) for the old domain become invalid.

To facilitate migration to the new domain, new permissions are created (238) by the configuration program.

In one embodiment, for each existing permission in the resource 104(1), a corresponding permission is created for the new domain. For example, if an existing permission is for the domain name-username combination of D1-X, and the new domain is D2, then a new permission is created for the domain name-username combination D2-X. This has the effect of migrating the old permission to the new domain so that the resource 104(1) can now be used by username X to access an account on the new domain. Notice that block (238) does not create a user account for username X on the new domain. It just makes it possible for resource 104(1) to be used by username X to access an account on the new domain, once such an account is created.

After the new permissions are created, the configuration program proceeds to install (242) a profile copier program on the resource 104(1). In one embodiment, the code for the profile copier program is incorporated within the configuration program. Thus, to install the profile copier program, the configuration program installs a replica of itself, and sets the name of the installed program to ProfileCopier.exe. With the name thus changed, the next time the configuration program is executed, the code associated with the profile copier will be executed instead of the code for configuring a resource.

To illustrate how the two sets of code may be managed, reference will be made to the functional diagram of the configuration program shown in FIG. 4. As shown, the configuration program comprises a section of code 408 that corresponds to a profile copier. The configuration program further comprises a section of code 402 that checks the name of the configuration program. If the name of the program is set to ProfileCopier.exe, then the code section 402 causes execution to jump down to the profile copier code section 408, skipping the code sections 404, 406 corresponding to resource configuration. Thus, by setting the name of the program to ProfileCopier.exe, the configuration program effectively prevents the configuration code sections 404, 406 from being executed in the future. In this manner, the configuration program is transformed from a resource configuration program into a profile copier program. In one embodiment, after the profile copier program is installed, the program is added to the list of programs that is executed upon system start up. That way, the profile copier is executed each time the resource 104(1) is started. The operation and purpose of the profile copier program will be described in detail in a later section.

After the profile copier is installed, the configuration process is complete. For the new configuration to take effect, the resource 104(1) should be rebooted. Thus, the configuration program sends (246) a message to the user to reboot the resource 104(1). The user may reboot the resource 104(1) immediately, or wait until a later time. After sending the reboot message, the configuration program exits and terminates execution.

At some point, the resource 104(1) is rebooted by the user. When that occurs, the profile copier program is executed as part of the start up process to give a user an opportunity to copy an existing profile into a new profile. By doing so, the profile copier makes the transition from one network configuration to another network configuration a transparent one from a user's point of view. Before describing the operation of the profile copier in detail, however, a short discussion of profiles will first be provided to facilitate a complete understanding of the present invention.

As noted previously, each domain name-username combination has a permission associated therewith. This permission is stored within the resource 104(1), and corresponds to an account specified by the domain name-username combination. An account may be a local account (i.e. local to the resource 104(1)), or it may be a network account on a particular domain. Depending upon the type of account, an account may be used by a user to access the local resource 104(1) or to access resources on a network domain.

While a user is logged in to an account, the user is provided with an operating environment. This operating environment defines all aspects of the user's experience with the resource 104(1) while in that account. For example, the operating environment may define the manner in which icons are arranged on a display, the particular applications that can be executed from the account, the look and feel of the user interface, etc. In addition, the operating environment may contain settings specific to the user, such as the email account that should be checked for email when the user starts an email program, and the homepage that should be accessed when the user starts a browser program. Basically, anything that determines, controls, or has an effect on the user's experience with the resource 104(1) is part of the operating environment. The operating environment may comprise default settings established by the resource 104(1), customized settings established by the user, or a combination of both.

In one embodiment, all of the settings and preferences that define an operating environment are stored in a profile. Most of the information in a profile is stored in the registry of the resource 104(1), but some profile information may be stored elsewhere. Where the additional profile information is stored depends upon the specific system. In one embodiment, each profile is associated with a specific domain name-username combination. That being the case, each domain name-username combination (i.e. each account) may have a different profile associated therewith. This means that if a user has multiple accounts, the user may have a different operating environment for each account.

As noted above, when a user account (e.g. D1-X) is moved from one domain to another, a new domain name-username combination (e.g. D2-X) is created, along with a new associated permission. When the new domain name-username combination (D2-X) is created, a new profile is also created and associated with the new combination. Since the new profile is newly created, it will contain only the default settings established by the resource 140(1). It will not include any of the customizations established by the user in the old account (D1-X). This means that when the user logs in to the new account (D2-X), he will not experience the same operating environment as the one to which he has become accustomed. Instead, he will experience the default environment set up by the resource 104(1). To get the same environment as the one he had in the old account, the user will have to remake all of the customizations that he made to the operating environment of the old account in the new account. This can be a time consuming and labor intensive endeavor. To remove this burden from the user, and to make the transition from one network configuration to another as seamless as possible, the present invention provides the profile copier program. With reference to the flow diagram of FIG. 3, the operation of the profile copier program will now be described.

As noted previously, the profile copier program is executed as part of the start up or boot up process of the resource 104(1). Also as part of the start up process, the user is asked to log in to an account. The user may log in to a local account or a network account on a domain. Once the user logs in to an account, the domain name-username combination of the account is known. Using this combination, the profile copier program accesses (304) the associated profile from the registry of the resource 104(1), and performs a check (308) to determine whether the associated profile is a candidate for update. In one embodiment, this check is performed by checking the status of an update flag associated with the profile. The update flag will be reset if: (1) the profile is new; and (2) a user has not indicated that he does not wish to copy an existing profile into the profile. The update flag will be set if: (1) the profile is not new; or (2) a user has indicated that he does not wish to copy an existing profile into the profile. By default, the update flag is initially reset. If the profile copier program determines that the update flag is set, thereby indicating that profile copying should not be performed, the program exits and terminates execution. Otherwise, the program proceeds to (312) to search for existing profiles.

More specifically, using the username specified in the domain name-username combination, the profile copier program searches (312) the registry of the resource 104(1) for profiles associated with the same username but different domains. In effect, the program is searching for profiles associated with other accounts that the same user might have. This search may uncover zero, one, or multiple profiles. If no other profile with the same username is found, then the program proceeds to set (328) the update flag to indicate that the profile is no longer a candidate for update. Thereafter, the program exits and terminates execution.

On the other hand, if the search uncovers one or more other profiles with the same username, the program provides (320) the user with an opportunity to copy one of these other profiles into the current profile. More specifically, for each profile that was found, the program asks the user whether he wishes to copy that profile into the current profile. If the user answers no to all of the profiles, then the program proceeds to set (328) the update flag to indicate that the current profile is no longer a candidate for update. Then, the program exits, and terminates execution. However, if the user answers yes to any of the profiles, then the program copies (324) that profile into the current profile. By doing so, the program is in effect migrating the operating environment of an existing account into the current account. That way, if an account is moved from one domain to another, for example, the new account on the new domain will be able to enjoy the same operating environment as the old account without requiring re-customization by the user. This can save the user a significant amount of time and effort. After the profile is copied into the current profile, the program sets (328) the update flag to indicate that the current profile is no longer a candidate for update. Thereafter, the program exits and terminates execution. In the manner described above, a resource is configured automatically to interact with a network.

Hardware Overview

Figure 5:
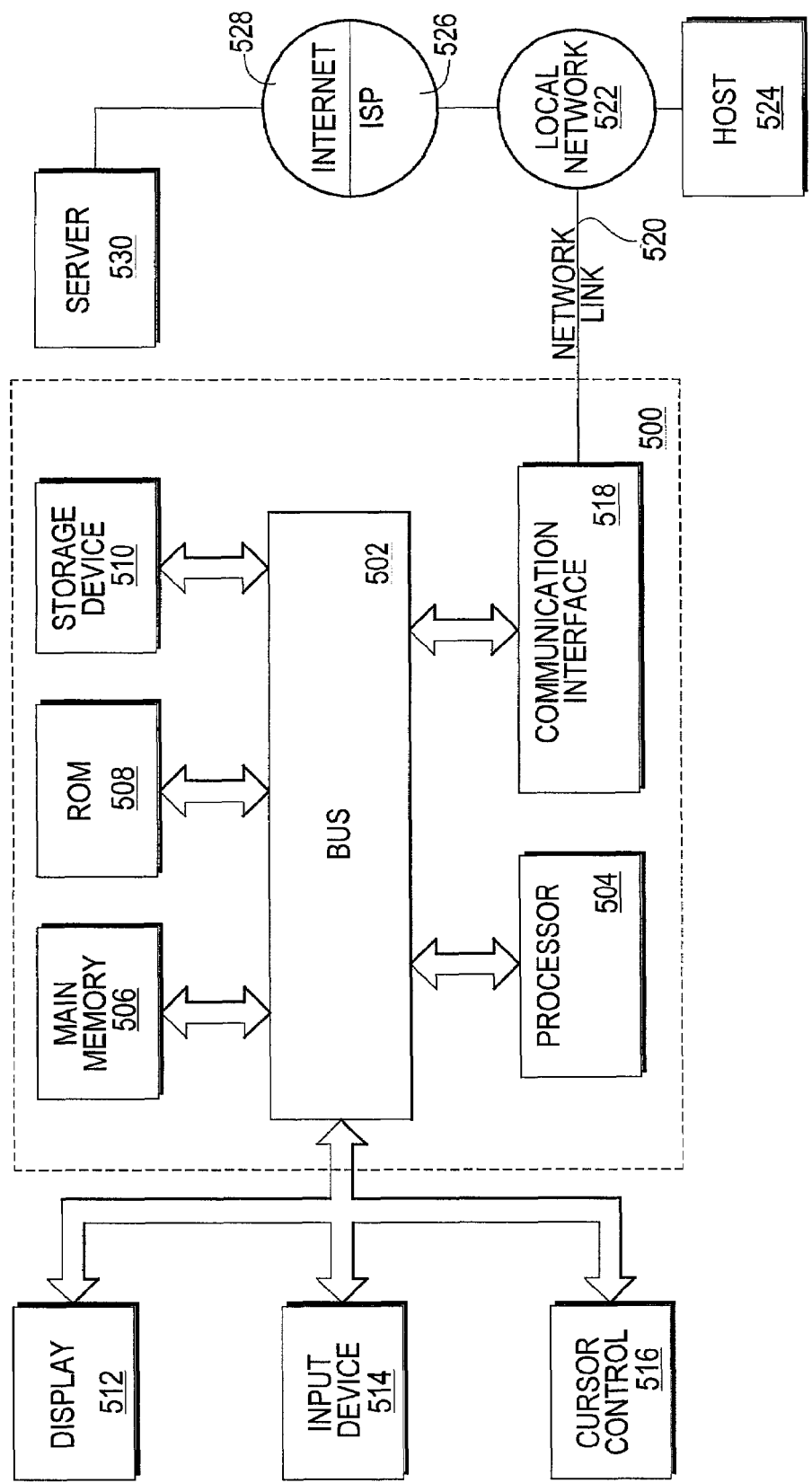
FIG. 5 is a hardware block diagram of a computer system in which one embodiment of the present invention may be implemented.

In one embodiment, the configuration program of the present invention is implemented as a set of instructions executable by one or more processors. The invention may be implemented, for example, as part of an object oriented programming system. FIG. 5 shows a hardware block diagram of a computer system 500 in one embodiment of the configuration program may be executed. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 may also be further used to store temporary variables or other intermediate information during execution of instructions by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

According to one embodiment, the functionality of the present invention is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile storage media, volatile storage media, and transmission media. Non-volatile storage media Non-volatile media includes, for example, optical or magnetic disks, such as storage device 510. Volatile storage media includes dynamic memory, such as main memory 506. Transmission media includes coaxial cables, copper wire and fiber optics, including the wires that comprise bus 502. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A method implemented by a resource to configure itself to be part of a particular domain on a network, wherein the particular domain defines a set of resources that can be accessed on the network, and wherein access to the set of resources in the particular domain is controlled by a domain controller, the method comprising:

obtaining a set of configuration information, the set of configuration information comprising login information for an administrator account on the particular domain that has high level administrative privileges, the set of configuration information further comprising network information for enabling the resource to communicate on the network;

upon obtaining the set of configuration information, automatically performing the following without user intervention:

configuring the resource in accordance with at least a portion of the network information;

interacting with the domain controller, using the login information, to log in to the administrator account on the particular domain; and causing, using the administrative privileges of the administrator account, the domain controller to register the resource with the particular domain such that the domain controller recognizes the resource as being part of the set of resources that are in the particular domain.

2. The method of claim 1, further comprising:

interacting with a server to obtain an address for the domain controller to enable the resource to communicate and interact with the domain controller.

3. The method of claim 2, wherein the network information comprises an address for the server to enable the resource to communicate and interact with the server.

4. The method of claim 1, wherein at least a portion of the configuration information is imbedded within a computer program, and wherein obtaining the configuration information comprises:

extracting the portion of the configuration information from the computer program.

5. The method of claim 4, wherein the portion of the configuration information is encrypted, and wherein extracting the portion of the configuration information comprises:

decrypting the portion of the configuration information.

6. The method of claim 1, wherein the network information comprises information specific to the resource, and wherein obtaining the configuration information comprises:

retrieving the information specific to the resource from a registry stored within the resource.

7. The method of claim 1, wherein at least a portion of the configuration information is user-specifiable.

8. The method of claim 1, further comprising:

establishing a local user account on the resource to enable the user to log in to and use the resource.

9. The method of claim 1, wherein the resource comprises an established permission which enables another user to use the resource, and wherein the method further comprises:

establishing a new permission within the resource to enable the other user to use the resource to log on to the particular domain.

10. The method of claim 1, further comprising:

causing, using administrative privileges of the administrator account, the domain controller to establish a user account on the particular domain to enable a user to log on to the particular domain using the user account and access at least a subset of the set of resources in the particular domain; and establishing a permission within the resource to enable the user to use the resource to log in to the user account on the particular domain.

11. The method of claim 1, further comprising:

causing, using the administrative privileges of the administrator account, the domain controller to establish a user account on the particular domain to enable a user to log on to the particular domain using the user account and access at least a subset of the set of resources in the particular domain;

finding, within the resource, an existing profile associated with another account held by the user for another domain, wherein the existing profile comprises information that defines an operating environment that has been customized by the user for the other domain; and copying the existing profile into a profile associated with the user account on the particular domain, thereby, migrating the operating environment associated with the other account for the other domain into the user account on the particular domain.

12. The method of claim 1, further comprising:

causing, using the administrative privileges of the administrator account, the domain controller to establish a user account on the particular domain to enable a user to log on to the particular domain using the user account and access at least a subset of the set of resources in the particular domain;

installing in the resource a computer program which, when executed by the resource, causes the resource to perform the following operations:

finding, within the resource, an existing profile associated with another account held by the user for another domain, wherein the existing profile comprises information that defines an operating environment that has been customized by the user for the other domain; and copying the existing profile into a profile associated with the user account on the particular domain, thereby, migrating the operating environment associated with the other account for the other domain into the user account on the particular domain.

13. The method of claim 1, further comprising:

causing, using the administrative privileges of the administrator account, the domain controller to establish a user account on the particular domain to enable a user to log on to the particular domain using the user account and access at least a subset of the set of resources in the particular domain.

14. A computer readable storage medium comprising program instructions, which when executed by one or more processors of a resource, cause the resource to configure itself to be part of a particular domain on a network, wherein the particular domain defines a set of resources that can be accessed on the network, and wherein access to the set of resources in the particular domain is controlled by a domain controller, the program instructions comprising:

instructions for causing one or more processors to obtain a set of configuration information, the set of configuration information comprising login information for an administrator account on the particular domain that has high level administrative privileges, the set of configuration information further comprising network information for enabling the resource to communicate on the network;

instructions for causing one or more processors to automatically configure, without user intervention, the resource in accordance with at least a portion of the network information;

instructions for causing one or more processors to automatically interact, without user intervention, with the domain controller, using the login information, to log in to the administrator account on the particular domain; and instructions for causing one or more processors to automatically cause, without user intervention, using the administrative privileges of the administrator account, the domain controller to register the resource with the particular domain such that the domain controller recognizes the resource as being part of the set of resources that are in the particular domain.

15. The computer readable storage medium of claim 14, wherein the program instructions further comprise: instructions for causing one or more processors to interact with a server to obtain an address for the domain controller to enable the resource to communicate and interact with the domain controller.

16. The computer readable storage medium of claim 15, wherein the network information comprises an address for the server to enable the resource to communicate and interact with the server.

17. The computer readable storage medium of claim 14, wherein the program instructions are embodied in a computer program, and wherein at least a portion of the configuration information is imbedded within the computer program.

18. The computer readable storage medium of claim 16, wherein the instructions for causing one or more processors to obtain the configuration information comprises:

instructions for causing one or more processors to extract the portion of the configuration information from the computer program.

19. The computer readable storage medium of claim 18, wherein the portion of the configuration information is encrypted, and wherein the instructions for causing one or more processors to extract the portion of the configuration information comprises:

instructions for causing one or more processors to decrypt the portion of the configuration information.

20. The computer readable storage medium of claim 17, wherein the program instructions further comprise:

instructions for causing one or more processors to receive a set of input; and instructions for causing one or more processors to imbed the set of input within the computer program as the portion of the configuration information.

21. The computer readable storage medium of claim 20, wherein the instructions for causing one or more processors to imbed the set of input within the computer program comprises:

instructions for causing one or more processors to encrypt the set of input.

22. The computer readable storage medium of claim 14, wherein the network information comprises information specific to the resource, and wherein the instructions for causing one or more processors to obtain the configuration information comprises:

instructions for causing one or more processors to retrieve the information specific to the resource from a registry stored within the resource.

23. The computer readable storage medium of claim 14, wherein at least a portion of the configuration information is user-specifiable.

24. The computer readable storage medium of claim 14, wherein the program instructions further comprise:

instructions for causing one or more processors to establish a local user account on the resource to enable the user to log in to and use the resource.

25. The computer readable storage medium of claim 14, wherein the resource comprises an established permission which enables another user to use the resource, and wherein the program instructions further comprise:

instructions for causing one or more processors to establish a new permission within the resource to enable the other user to use the resource to log on to the particular domain.

26. The computer readable storage medium of claim 14, wherein the program instructions further comprise:

instructions for causing one or more processors to automatically cause, without user intervention, using the administrative privileges of the administrator account, the domain controller to establish a user account on the particular domain to enable a user to log on to the particular domain using the user account and access at least a subset of the set of resources in the particular domain; and instructions for causing one or more processors to establish a permission within the resource to enable the user to use the resource to log in to the user account on the particular domain.

27. The computer readable storage medium of claim 14, wherein the program instructions further comprise:

instructions for causing one or more processors to automatically cause, without user intervention, using the administrative privileges of the administrator account, the domain controller to establish a user account on the particular domain to enable a user to log on to the particular domain using the user account and access at least a subset of the set of resources in the particular domain;

instructions for causing one or more processors to find, within the resource, an existing profile associated with another account held by the user for another domain, wherein the existing profile comprises information that defines an operating environment that has been customized by the user for the other domain; and instructions for causing one or more processors to copy the existing profile into a profile associated with the user account on the particular domain, thereby, migrating the operating environment associated with the other account for the other domain into the user account on the particular domain.

28. The computer readable storage medium of claim 27, wherein the program instructions are embodied in a computer program, and wherein the program instructions further comprise:

instructions for causing one or more processors to install the computer program onto the resource.

29. The computer readable storage medium of claim 28, wherein the computer program has a first name, and wherein the instructions for causing one or more processors to install the computer program comprises:

instructions for causing one or more processors to rename the computer program to a second name before installing it onto the resource.

30. The computer readable storage medium of claim 29, wherein the program instructions further comprise:

instructions for causing one or more processors to determine a current name associated with the computer program; and instructions for causing one or more processors, in response to a determination that the current name of the computer program is the second name, to forego execution of all instructions except for the instructions for causing one or more processors to find the existing profile associated with another account held by the user for another domain, and the instructions for causing one or more processors to copy the existing profile into a profile associated with the user account on the particular domain.

31. The computer readable storage medium of claim of claim 14, wherein the program instructions further comprise:

instructions for causing one or more processors to automatically cause, without user intervention, using the administrative privileges of the administrator account, the domain controller to establish a user account on the particular domain to enable a user to log on to the particular domain using the user account and access at least a subset of the set of resources in the particular domain.

* * * * *

UNITED STATES PATENT AND TRADEMARK OFFICE
CERTIFICATE OF CORRECTION

PATENT NO. : 7,089,297 B1  
APPLICATION NO. : 09/866111  
DATED : August 8, 2006  
INVENTOR(S) : Jose M. Salas Page 1 of 1

It is certified that error appears in the above-identified patent and that said Letters Patent is hereby corrected as shown below:

COLUMN 16  
Claim 18: Line 23: Delete "claim 16," and insert --claim 17,"--.

Signed and Sealed this

Twenty-sixth Day of December, 2006

JON W. DUDAS  
*Director of the United States Patent and Trademark Office*